(12) United States Patent
Yamaguchi et al.

(10) Patent No.: US 10,701,768 B2
(45) Date of Patent: Jun. 30, 2020

(54) EDDY CURRENT HEAT GENERATING APPARATUS

(71) Applicant: NIPPON STEEL & SUMITOMO METAL CORPORATION, Tokyo (JP)

(72) Inventors: Hiroyuki Yamaguchi, Nishinomiya (JP); Atsushi Seto, Amagasaki (JP); Kenji Imanishi, Kishiwada (JP); Hiroshi Nogami, Takatsuki (JP)

(73) Assignee: NIPPON STEEL CORPORATION, Tokyo (JP)

( * ) Notice: Subject to any disclaimer, the term of this patent is extended or adjusted under 35 U.S.C. 154(b) by 380 days.

(21) Appl. No.: 15/522,303

(22) PCT Filed: Nov. 5, 2015

(86) PCT No.: PCT/JP2015/005559
§ 371 (c)(1),
(2) Date: Apr. 27, 2017

(87) PCT Pub. No.: WO2016/072094
PCT Pub. Date: May 12, 2016

(65) Prior Publication Data
US 2017/0339752 A1    Nov. 23, 2017

(30) Foreign Application Priority Data

Nov. 6, 2014    (JP) ................. 2014-226199

(51) Int. Cl.
*H05B 6/10*    (2006.01)
*H02K 49/02*    (2006.01)
(Continued)

(52) U.S. Cl.
CPC ............... *H05B 6/109* (2013.01); *F03D 9/18* (2016.05); *F03D 9/22* (2016.05); *H02K 49/02* (2013.01);
(Continued)

(58) Field of Classification Search
CPC .......... H05B 6/02; H05B 6/108; H05B 6/109; H02K 49/02; H02K 49/043; H02K 49/046;
(Continued)

(56) References Cited

U.S. PATENT DOCUMENTS 1,008,622 A    11/1911    Thomson
4,486,638 A    12/1984    De Bennetot
(Continued)

FOREIGN PATENT DOCUMENTS

CN    101044953    10/2007
EP    2239523    10/2010
(Continued)

*Primary Examiner* — Hung D Nguyen
(74) *Attorney, Agent, or Firm* — Clark & Brody LP (57) ABSTRACT

The disclosed heat generating apparatus includes: a rotary shaft, a heat generator, a plurality of permanent magnets, a magnet holder, and a heat recovery system. The rotary shaft is rotatably supported by a non-rotative body. The heat generator is fixed to the body. The magnets are arrayed to face the heat generator with a gap such that magnetic pole arrangements of adjacent ones of the magnets are opposite to each other. The magnet holder holds the magnets and is fixed to the rotary shaft. The heat recovery system collects heat generated in the heat generator. A non-magnetic partition wall is provided in the gap between the heat generator and the magnets.

13 Claims, 8 Drawing Sheets

(51) Int. Cl.
   *H05B 6/02*      (2006.01)
   *F03D 9/18*      (2016.01)
   *F03D 9/22*      (2016.01)
   *H02K 49/04*     (2006.01)
   *F03D 7/02*      (2006.01)

(52) U.S. Cl.
   CPC ............. *H02K 49/046* (2013.01); *H05B 6/02* (2013.01); *H05B 6/108* (2013.01); *F03D 7/0244* (2013.01)

(58) Field of Classification Search
   CPC .... H02K 49/108; H02K 49/007; H02K 49/17; H02K 49/18; H02K 49/22; H02K 49/25; H02K 49/28; F03D 9/007; F03D 9/17; F03D 9/18; F03D 9/22; F03D 9/25; F03D 9/28; F03D 7/0244
   USPC ....... 219/600, 628, 629, 630, 631, 632, 635, 219/677
   See application file for complete search history.

(56) References Cited

U.S. PATENT DOCUMENTS 5,914,065 A * 6/1999 Alavi .................. H05B 6/108
                                                         219/631
   2006/0220478 A1  10/2006 Emoto
   2010/0219177 A1 * 9/2010 Matsui .................. F24H 3/0405
                                                         219/600
   2013/0062340 A1  3/2013 Hsu
   2015/0083713 A1 * 3/2015 Dughiero ............... H05B 6/102
                                                         219/632

FOREIGN PATENT DOCUMENTS

| | | | |
   |---|---|---|---|
   | JP | 09-289076 | | 11/1997 |
   | JP | 10-155266 | | 6/1998 |
   | JP | 10-155266 A | * | 6/1998 |
   | JP | 2000-123962 | | 4/2000 |
   | JP | 2000-358354 | | 12/2000 |
   | JP | 2001-018634 | | 1/2001 |
   | JP | 2005-174801 | | 6/2005 |
   | JP | 2009-002606 | | 1/2009 |
   | JP | 2011-089492 | | 5/2011 |
   | JP | 2011-89492 A | * | 5/2011 |
   | JP | 2011-233488 | | 11/2011 |
   | JP | 2012-160369 | | 8/2012 |
   | JP | 2012-160369 A | * | 8/2012 |
   | JP | 2014-500906 | | 1/2014 |
   | WO | 2011/093192 | | 8/2011 |
   | WO | 2014/167429 | | 10/2014 |

* cited by examiner

EDDY CURRENT HEAT GENERATING APPARATUS

TECHNICAL FIELD

The present invention relates to a heat generating apparatus that recovers thermal energy from kinetic energy of a rotary shaft, and more particularly to an eddy current heat generating apparatus employing permanent magnets (hereinafter referred to simply as "magnets") and utilizing eddy currents generated by the effects of magnetic fields from the magnets.

BACKGROUND ART

In recent years, generation of carbon dioxide accompanying burning of fossil fuels is acknowledged as a problem. Therefore, utilization of natural energy, such as solar thermal energy, wind energy, hydro-energy and the like, is promoted. Among the natural energy, wind energy and hydro-energy are kinetic energy of a fluid. Conventionally, electric power has been generated from kinetic energy of a fluid.

For example, in a typical wind electric generating facility, a propeller receives wind and thereby rotates. The rotary shaft of the propeller is connected to the input shaft of a power generator, and along with the rotation of the propeller, the input shaft of the power generator rotates. Thereby, electric power is generated in the power generator. In short, in a typical wind electric generating facility, wind energy is converted to kinetic energy of the rotary shaft of a propeller, and the kinetic energy of the rotary shaft is converted to electric energy.

Japanese Patent Application Publication No. 2011-89492 (Patent Literature 1) suggests a wind electric generating facility with improved energy use efficiency. The electric generating facility disclosed in Patent Literature 1 includes a heat generator (retarder 30 in Patent Literature 1) that generates thermal energy in the process of converting wind energy to electric energy.

In the wind electric generating facility disclosed in Patent Literature 1, wind energy is converted to kinetic energy of the rotary shaft of a propeller, and the kinetic energy of the propeller is converted to hydraulic energy of a hydraulic pump. The hydraulic energy rotates a hydraulic motor. The spindle of the hydraulic motor is connected to the rotary shaft of the heat generator, and the rotary shaft of the heat generator is connected to the input shaft of a power generator. Along with rotation of the hydraulic motor, the rotary shaft of the heat generator rotates, and the input shaft of the power generator rotates, whereby electricity is generated in the power generator.

The heat generator utilizes eddy currents generated by the effects of magnetic fields from permanent magnets to reduce the rotational speed of the rotary shaft of the heat generator. Accordingly, the rotational speed of the spindle of the hydraulic motor is reduced, and the rotational speed of the propeller is adjusted via the hydraulic pump.

In the heat generator, the generation of eddy currents leads to generation of braking force to reduce the rotational speed of the rotary shaft of the heat generator, and generation of heat as well. Thus, a part of wind energy is converted to thermal energy. According to Patent Literature 1, the heat (thermal energy) is collected in a heat storage device, and the motor is driven by the collected thermal energy, whereby the power generator is driven. Consequently, electricity is generated in the power generator.

CITATION LIST

Patent Literature

Patent Literature 1: Japanese Patent Application Publication No. 2011-89492

SUMMARY OF INVENTION

Technical Problems

The wind electric generating facility disclosed in Patent Literature 1 includes a hydraulic pump and a hydraulic motor between a propeller that is a rotary shaft and a heat generator. Thus, the structure of the facility is complicated. Also, multistage energy conversion is necessary, and a large energy loss is caused during the energy conversion. Accordingly, the thermal energy obtained in the heat generator is small.

In the heat generator disclosed in Patent Literature 1, a plurality of magnets are circumferentially arrayed to face the whole circumference of the inner peripheral surface of a cylindrical rotor. The magnetic poles (the north pole and the south pole) of each of the magnets are circumferentially arranged, and the magnetic pole arrangements of adjacent ones of the circumferentially arrayed magnets are the same. Therefore, the magnetic fields of the magnets do not spread, and the magnetic flux density reaching the rotor is low. Then, the eddy currents generated in the rotor by the effects of magnetic fields from the magnets are low, and it is not possible to achieve sufficient heat generation.

The present invention has been made in view of the current situation. An object of the present invention is to provide an eddy current heat generating apparatus that is capable of efficiently recovering thermal energy from kinetic energy of a rotary shaft.

Solution to Problem

An eddy current heat generating apparatus according to an embodiment of the present invention includes:

a rotary shaft rotatably supported by a non-rotative member;

a heat generator fixed to the non-rotative member;

a plurality of permanent magnets arrayed to face the heat generator with a gap such that magnetic pole arrangements of adjacent ones of the permanent magnets are opposite to each other;

a magnet holder holding the permanent magnets and fixed to the rotary shaft; and a heat recovery system collecting heat generated in the heat generator, wherein a non-magnetic partition wall is provided in the gap between the heat generator and the permanent magnets.

Advantageous Effects of Invention

In the eddy current heat generating apparatus according to the present invention, the magnetic pole arrangements of adjacent ones of the magnets arrayed to face the heat generator are opposite to each other. Accordingly, the magnetic fields of the magnets spread out, and the magnetic flux density reaching the heat generator becomes high. Accordingly, the eddy currents generated in the heat generator by the effects of magnetic fields from the magnets become high, thereby allowing for a sufficient amount of heat generation. Thus, according to the present invention, thermal energy can be recovered from the kinetic energy of the rotary shaft efficiently. Further, according to the present invention, a non-magnetic partition wall is provided in the gap between the heat generator and the permanent magnets, whereby temperature rise of the magnets is inhibited. Consequently, deterioration of the apparatus is restrained.

DESCRIPTION OF EMBODIMENTS

Embodiments of the present invention will hereinafter be described. In the following, the embodiments of the present invention will be described with some examples given. However, the present invention is not limited to the examples that will be given below. In the following, specific values and materials may be presented as examples, but other values and materials may be used as long as the use of those values and materials provides the effects of the present invention.

An eddy current heat generating apparatus according to an embodiment of the present invention includes a rotary shaft, a heat generator, a plurality of permanent magnets, a magnet holder, and a heat recovery system. The rotary shaft is rotatably supported by a non-rotative member. The heat generator is fixed to the non-rotative member. The plurality of permanent magnets are arrayed to face the heat generator with a gap such that the magnetic pole arrangements of adjacent ones of the magnets are opposite to each other. The magnet holder holds the permanent magnets, and is fixed to the rotary shaft. The heat recovery system collects heat generated in the heat generator.

At least a part of the heat generator is made of a material that causes electromagnetic induction (specifically, a conductive material). It is preferred that at least the portion of the heat generator adjacent to the magnets is made of such a material that causes electromagnetic induction. Specific examples of the material for the heat generator will be given later.

In the eddy current heat generating apparatus according to the present embodiment, since the magnetic pole arrangements of adjacent ones of the magnets arrayed to face the heat generator are opposite to each other, the magnetic fields of the magnets spread out, and the magnetic flux density reaching the heat generator is high. Accordingly, high eddy currents are generated by the effects of magnetic fields from the magnets, and sufficient heat generation can be achieved. Thus, it is possible to recover thermal energy from kinetic energy of the rotary shaft efficiently.

In the heat generating apparatus, it is preferred that a non-magnetic partition wall is provided in the gap between the heat generator and the permanent magnets. In this case, preferably, the space between the heat generator and the partition wall is filled with a heat insulating material or alternatively is made vacuum.

In a case where the partition wall does not rotate together with the magnets, it is preferred that the partition wall is made of any of low-conductivity materials (including non-conductivity materials). Examples of the low-conductivity materials include materials with conductivity not more than $5 \times 10^6$ S/m (for example, not more than 1 S/m, not more than $10^{-6}$ S/m or $10^{-10}$ S/m). The partition wall is made of, for example, high heat resistance resin, such as austenite stainless steel and PEEK resin, ceramics and the like. The surface of the partition wall facing the heat generator may be a mirror surface with high smoothness. This reduces heat transfer from the heat generator to the magnets.

The heat generating apparatus may further include a cover disposed around the heat generator. The cover reduces radiation of the heat generated in the heat generator. From the viewpoint of reduction in heat radiation, it is preferred that the cover is made of a material with a high heat insulation property. From the viewpoint of reduction in heat radiation, further, the space between the heat generator and the cover may be filled with a heat insulating material or alternatively may be made vacuum. When the heat generator is cylindrical, the cover may be disposed to cover the outer peripheral surface of the cylindrical heat generator. When the heat generator is disk-shaped, the cover may be disposed to cover the surface of the heat generator opposite to the surface thereof facing the magnets. The cover and the partition wall may be arranged such that the heat generator is disposed between the cover and the partition wall. In an example of the apparatus according to the present invention, the cover may wholly surround the heat generator and the other components (for example, the partition wall and other components) as well.

In the heat generating apparatus, the heat recovery system may include a passage formed inside the heat generator, pipes connected to the inlet and the outlet, respectively, of the passage, a heat storage device connected to the pipes, and a heat medium circulating in the passage, the pipes and the heat storage device. There are no special limitations to the heat storage device, and a known heat storage device where thermal energy carried by the heat medium can be stored is usable. There are no special limitations to the heat medium, and a known heat medium is usable. The heat medium may be, for example, molten salt of a nitrate-based material (for example, mixed salt of sodium nitrate: 60% and potassium nitrate: 40%). Alternatively, heat medium oil, water (steam), air, supercritical $CO_2$ or the like may be used.

The heat generating apparatus may be an apparatus that recovers thermal energy from kinetic energy of the rotary shaft rotated by kinetic energy of a fluid. The kinetic energy of a fluid includes natural energy such as wind power and hydraulic power. Kinetic energy obtained from natural energy is variable, but the heat generating apparatus can recover thermal energy even from such variable kinetic energy without decreasing the efficiency very much.

It is preferred that the heat generating apparatus further includes a cooling system for cooling the permanent magnets.

In the heat generating apparatus, the heat generator may be cylindrical, and the permanent magnets may be circumferentially arrayed to face the whole circumference of the inner peripheral surface of the heat generator such that the magnetic poles of each of the magnets are radially arranged and such that the magnetic pole arrangements of adjacent ones of the circumferentially arrayed magnets are opposite to each other. In this case, the magnet holder preferably includes a cylindrical member holding the permanent magnets on its outer peripheral surface, and the cylindrical member is preferably ferromagnetic. Examples of such ferromagnetic materials usable for the magnet holder include ferromagnetic metal materials (for example, carbon steel, cast iron and the like).

In the heat generating apparatus, the heat generator may be cylindrical, and the permanent magnets may be circumferentially arrayed to face the whole circumference of the inner peripheral surface of the heat generator such that the magnetic poles of each of the magnets are circumferentially arranged and such that the magnetic pole arrangements of adjacent ones of the circumferentially arrayed magnets are opposite to each other. In this case, the magnet holder preferably includes a cylindrical member holding the permanent magnets on its outer peripheral surface, and the cylindrical member is preferably non-magnetic. Further, it is preferred that pole pieces are provided between the circumferentially arrayed magnets. Examples of such non-magnetic materials usable for the magnet holder include non-magnetic metal materials (for example, aluminum alloys, austenitic stainless steel, copper alloys and the like).

In the heat generating apparatus, the heat generator may be cylindrical, and the permanent magnets may be axially arrayed to face the whole axial length of the inner peripheral surface of the heat generator such that the magnetic poles of each of the magnets are axially arranged and such that the magnetic pole arrangements of adjacent ones of the axially arrayed magnets are opposite to each other. In this case, the magnet holder preferably includes a cylindrical member holding the permanent magnets on its outer peripheral surface, and the cylindrical member is preferably non-magnetic. Further, it is preferred that pole pieces are provided between the axially arrayed magnets and at both ends of the axial array of permanent magnets.

In the heat generating apparatus, the heat generator may be disk-shaped, and the permanent magnets may be circumferentially arrayed to face the whole circumference of the principal surface of the heat generator such that the magnetic poles of each of the magnets are axially arranged and such that the magnetic pole arrangements of adjacent ones of the circumferentially arrayed magnets are opposite to each other. In this case, the magnet holder may include a disk-shaped member holding the permanent magnets on its surface facing the principal surface of the heat generator, and the disk-shaped member may be ferromagnetic.

In the heat generating apparatus, the heat generator may be disk-shaped, and the permanent magnets may be circumferentially arrayed to face the whole circumference of the principal surface of the heat generator such that the magnetic poles of each of the magnets are circumferentially arrayed and such that the magnetic pole arrangements of adjacent ones of the circumferentially arrayed magnets are opposite to each other. In this case, the magnet holder preferably includes a disk-shaped member holding the permanent magnets on its surface facing the principal surface of the heat generator, and the disk-shaped member is preferably non-magnetic. Further, it is preferred that pole pieces are provided between the circumferentially arrayed magnets.

In the heat generating apparatus, the heat generator may be disk-shaped, and the permanent magnets may be radially arrayed to face the whole radius of the principal surface of the heat generator such that the magnetic poles of each of the magnets are radially arranged and such that the magnetic pole arrangements of adjacent ones of the radially arrayed magnets are opposite to each other. In this case, the magnet holder preferably includes a disk-shaped member holding the permanent magnets on its surface facing the principal surface of the heat generator, and the disk-shaped member is preferably non-magnetic. Further, it is preferred that pole pieces are provided between the radially arrayed magnets and at both ends of the radial array of permanent magnets.

The apparatuses of the type including a cylindrical heat generator have some advantages as follows over the apparatuses of the type including a disk-shaped heat generator. In any of the apparatuses of the former type, it is easy to keep the relative speed of the heat generator to the permanent magnets high and constant, and accordingly, the apparatus is excellent in heat generation efficiency. Also, the apparatuses of the former type are easy to be reduced in size as compared with the apparatuses of the latter type.

In any of the above-described heat generating apparatuses, the heat generator may be made of one or more kinds of conductive magnetic materials.

In any of the above-described heat generating apparatuses, the heat generator may be made of at least a conductive ferromagnetic material and a conductive non-magnetic material, and the conductive non-magnetic material may be disposed close to the permanent magnets. Examples of such ferromagnetic materials include conductive ferromagnetic metal materials which will be described later. Examples of such conductive non-magnetic materials include conductive non-magnetic metal materials which will be described later.

Any of the above-described heat generating apparatuses can be mounted in an electric generating facility utilizing kinetic energy of a fluid (for example, natural energy such as wind energy and hydro-energy), such as a wind electric generating facility, a hydroelectric generating facility or the like. For example, by replacing the power-generating unit in a known wind electric or hydroelectric generating facility with one of the above-described heat generating apparatuses, it is possible to generate thermal energy. Accordingly, the structure of a known electric generating facility can be applied to the portions other than the heat generating apparatus. Also, any of the above-described heat generating apparatuses can be mounted in a vehicle. In either case, the heat generating apparatus recovers thermal energy from kinetic energy of a rotary shaft. The recovered thermal energy may be used for generation of electric energy.

Eddy current heat generating apparatuses according to some embodiments of the present invention will hereinafter be described.

First Embodiment

Figure 1:
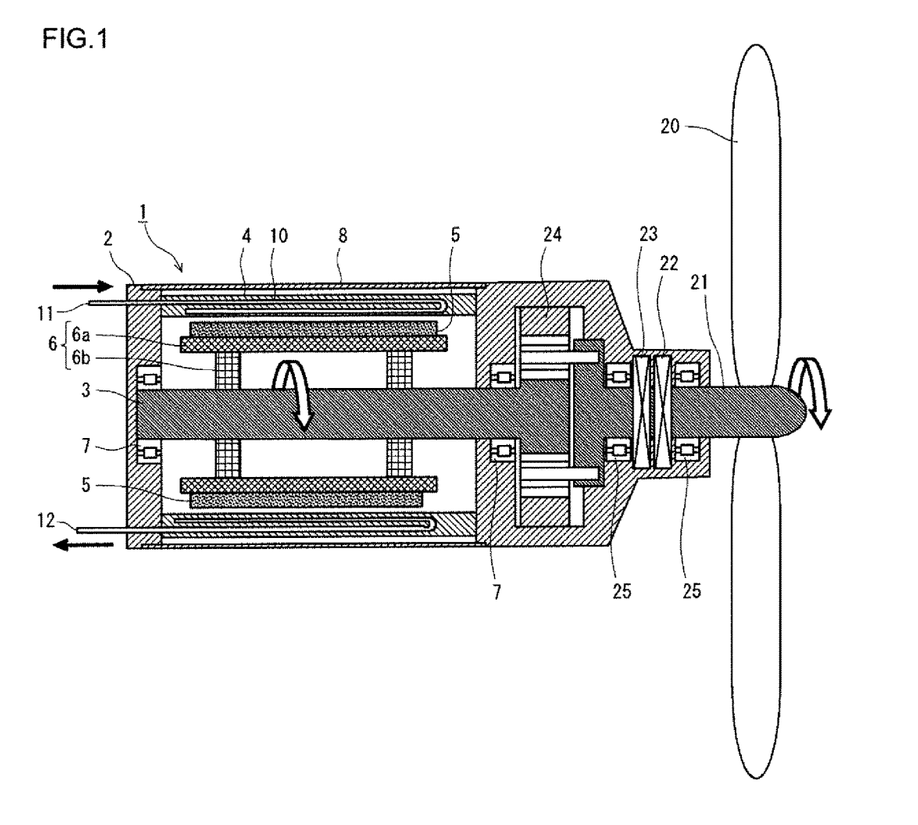
FIG. 1 is a longitudinal sectional view of a heat generating apparatus according to a first embodiment.
Figure 2:
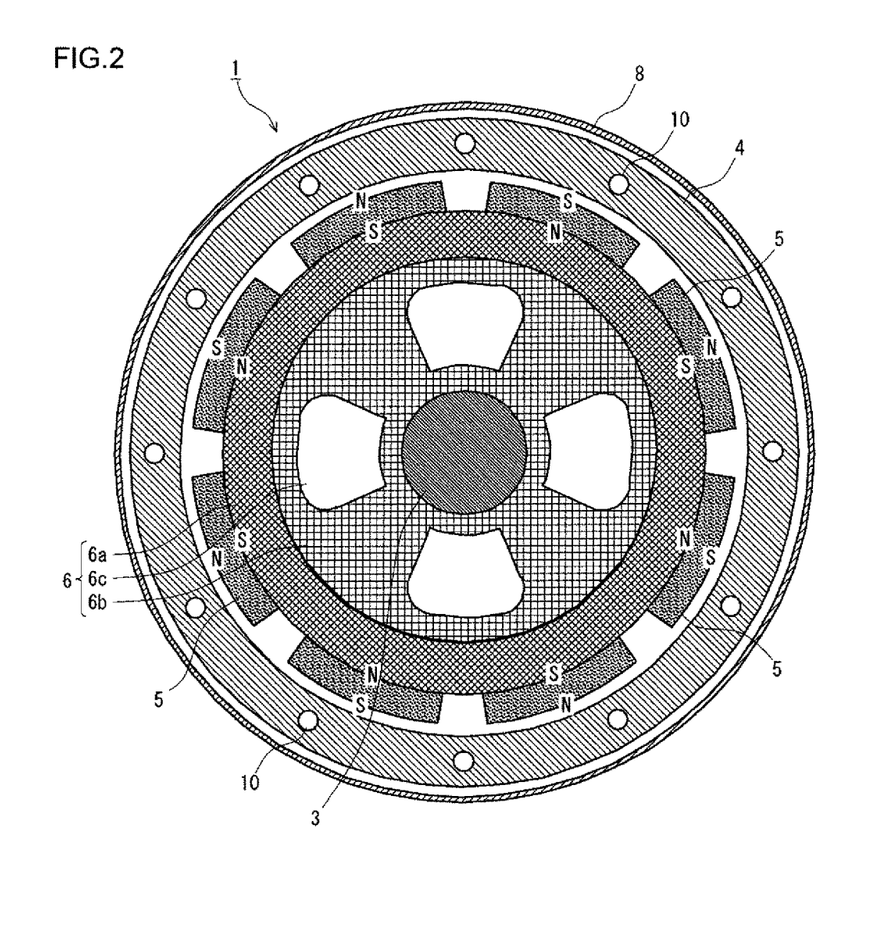
FIG. 2 is a cross-sectional view of the heat generating apparatus according to the first embodiment.

FIG. 1 is a longitudinal sectional view of a heat generating apparatus according to a first embodiment. FIG. 2 is a cross-sectional view of the heat generating apparatus according to the first embodiment. The heat generating apparatus illustrated in FIGS. 1 and 2 is mounted in a wind electric generating facility. The heat generating apparatus 1 according to the first embodiment includes a rotary shaft 3, a heat generator 4, a plurality of permanent magnets 5, and a magnet holder 6. The rotary shaft 3 is rotatably supported by a fixed non-rotative body 2 via a bearing 7.

The heat generator 4 is a cylindrical member that is coaxial with the rotary shaft 3, and it is fixed to the body 2. The magnet holder 6 is disposed in the inner side of the heat generator 4, and it is fixed to the rotary shaft 3. The magnet holder 6 includes a cylindrical member 6a that is coaxial with the rotary shaft 3, and a disk-shaped connection member 6b connecting the cylindrical member 6a and the rotary shaft 3. The cylindrical member 6a holds the magnets 5. A plurality of through holes 6c are made in the connection member 6b for weight saving and cooling.

The magnets 5 are fixed on the outer peripheral surface of the cylindrical member 6a so as to face the inner peripheral surface of the heat generator 4 with a gap. As seen in FIG. 2, the magnets 5 are circumferentially arrayed across the whole circumference. The magnetic poles (north pole and south pole) of each of the magnets 5 are radially arranged, and the magnetic pole arrangements of circumferentially adjacent ones of the magnets 5 are opposite to each other. In the first embodiment, the cylindrical member 6a directly holding the magnets 5 is made of a ferromagnetic material.

The heat generator 4, and especially the inner peripheral surface layer facing the magnets 5 is made of a conductive material. As examples of the conductive material, ferromagnetic metal materials (for example, carbon steel, cast iron and the like), feebly magnetic metal materials (for example, ferritic stainless steel and the like), and non-magnetic metal materials (for example, aluminum alloys, austenitic stainless steel, copper alloys and the like) can be named.

A cylindrical cover 8 is disposed in the outer side of the heat generator 4 to surround the whole heat generator 4. The cover 8 is fixed to the body 2. The cover 8 inhibits heat dissipation from the heat generator 4.

When the rotary shaft 3 rotates, the magnets 5 rotate together with the rotary shaft 3 (see the outlined arrow in FIG. 1). This causes a relative rotational speed difference between the magnets 5 and the heat generator 4. As shown in FIG. 2, the magnetic poles (north pole and south pole) of each of the magnets 5 facing the inner peripheral surface of the heat generator 4 are radially arranged, and the magnetic pole arrangements of circumferentially adjacent ones of the magnets 5 are opposite to each other. The cylindrical member 6a holding the magnets 5 is ferromagnetic.

In the structure, the magnetic fluxes from the magnets 5 (the magnetic fields of the magnets 5) are as follows. With regard to a first magnet 5 and a second magnet 5 that are adjacent to each other, the magnetic flux from the south pole of the first magnet 5 reaches the heat generator 4 facing the first magnet 5. The magnetic flux that has reached the heat generator 4 reaches the north pole of the second magnet 5. The magnetic flux from the south pole of the second magnet 5 reaches the north pole of the first magnet 5 via the cylindrical member 6a. Thus, the circumferentially adjacent magnets 5 form a magnetic circuit across the adjacent magnets 5, the cylindrical member 6a holding the magnets 5, and the heat generator 4. Such magnetic circuits are formed over the entire circumference such that adjacent magnetic fluxes are in opposite directions. Then, the magnetic fields of the magnets 5 spread out, and the magnetic flux density reaching the heat generator 4 becomes high.

In a state where there is a relative rotational speed difference between the magnets 5 and the heat generator 4, the magnetic fields of the magnets 5 act on the heat generator 4, thereby generating eddy currents along the inner peripheral surface of the heat generator 4. Interactions between the eddy currents and the magnetic flux density from the magnets 5 cause braking force acting on the magnet holder 6, which is rotating together with the rotary shaft 3, in the reverse direction to the rotational direction, according to Fleming's left-hand rule.

The generation of eddy currents causes heat generation of the heat generator 4 along with the generation of braking force. As described above, the magnetic flux density reaching the heat generator 4 is high, and therefore, the eddy currents generated in the heat generator 4 by the effects of magnetic fields from the magnets 5 are high, thereby resulting in achievement of sufficient heat generation.

The heat generating apparatus 1 includes a heat recovery system to collect and utilize the heat generated in the heat generator 4. In the first embodiment, the heat recovery system includes a passage 10 formed inside the heat generator 4. An inlet pipe and an outlet pipe, which are not shown in the drawings, are connected to an inlet 11 and an outlet 12 of the passage 10, respectively. The inlet pipe and the outlet pipe are connected to a heat storage device, which is not shown in the drawings. The passage 10 in the heat generator 4, the inlet pipe, the outlet pipe and the heat storage device form a pathway, and a heat medium flows and circulates in the pathway (see the solid arrows in FIG. 1).

The heat generated in the heat generator 4 is transferred to the heat medium flowing in the passage 10. The heat medium in the passage 10 is discharged from the passage 10 through the outlet 12, and led to the heat storage device via the outlet pipe. The heat storage device receives heat from the heat medium by heat exchange, and stores the heat therein. The heat medium that has passed through the heat storage device flows into the inlet pipe, and returns to the passage 10 through the inlet 11. In this way, the heat generated in the heat generator 4 is collected.

In the heat generating apparatus 1 according to the first embodiment, as described above, since sufficient heat generation is achieved by the heat generator 4, it is possible to recover thermal energy from kinetic energy of the rotary shaft 3 efficiently.

The heat generating apparatus 1 according to the first embodiment may be mounted in a wind electric generating facility. For example, the power-generating apparatus of the wind electric generating facility may be replaced with the heat generating apparatus 1 according to the first embodiment. In other words, as illustrated in FIG. 1, the propeller 20, which is a windmill, may be disposed on an extended line of the rotary shaft 3 of the heat generating apparatus 1. The rotary shaft 21 of the propeller 20 is rotatably supported by the fixed body 2 via a bearing 25. The rotary shaft 21 of the propeller 20 is connected to the rotary shaft 3 of the heat generating apparatus 1 via a clutch 23 and an accelerator 24. Rotation of the rotary shaft 21 of the propeller 20 is accompanied by rotation of the rotary shaft 3 of the heat generating apparatus 1. In this regard, the rotational speed of the rotary shaft 3 of the heat generating apparatus 1 is increased by the accelerator 24 to become higher than the rotational speed of the rotary shaft 21 of the propeller 20. As the accelerator 24, for example, a planetary gear mechanism can be used.

In the wind electric generating facility, the propeller 20 receives wind and rotates (see the outlined arrow in FIG. 1). The rotation of the propeller 20 is accompanied by rotation of the rotary shaft 3 of the heat generating apparatus 1, whereby heat is generated in the heat generator 4, and the generated heat is stored in the heat storage device. Thus, the kinetic energy of the rotary shaft 3 of the heat generating apparatus 1 generated by rotation of the propeller 20 is partly converted to thermal energy, and the thermal energy is collected and stored. In this regard, between the propeller 20 and the heat generating apparatus 1, there is no such thing as the hydraulic pump or hydraulic motor provided in the wind electric generating facility disclosed in Patent Literature 1, and the energy conversion loss is small. The heat stored in the heat storage device is utilized for electric generation by use of a thermal element, a Stirling engine, etc., for example.

The rotation of the rotary shaft 3 of the heat generating apparatus 1 causes generation of heat in the heat generator 4 and generation of braking force in the rotary shaft 3 to decelerate the rotation thereof. Thereby, the rotational speed of the propeller 20 is adjusted via the accelerator 24 and the clutch 23. The clutch 23 has the following functions. When heat generation in the heat generating apparatus 1 is needed, the clutch 23 connects the rotary shaft 21 of the propeller 20 to the rotary shaft 3 of the heat generating apparatus 1. Thereby, the rotating force of the propeller 20 is transmitted to the heat generating apparatus 1. When heat generation is no longer necessary because heat is stored in the heat storage device to capacity or when the heat generating apparatus 1 needs to be stopped for maintenance, the clutch 23 disconnects the rotary shaft 21 of the propeller 20 from the rotary shaft 3 of the heat generating apparatus 1. Thereby, the rotating force of the propeller 20 is not transmitted to the heat generating apparatus 1. In order to prevent the propeller 20 from rotating freely by wind on the occasion, it is preferred that a brake system of a frictional type, an electromagnetic type or the like to stop the rotation of the propeller 20 is provided between the propeller 20 and the clutch 23.

In the heat generating apparatus 1 according to the first embodiment, the space between the cover 8 surrounding the whole apparatus and the heat generator 4 is preferably filled with a heat insulating material or made vacuum. This prevents dissipation of the generated heat from the heat generator 4, thereby resulting in an increase in heat recovery efficiency.

Figure 3:
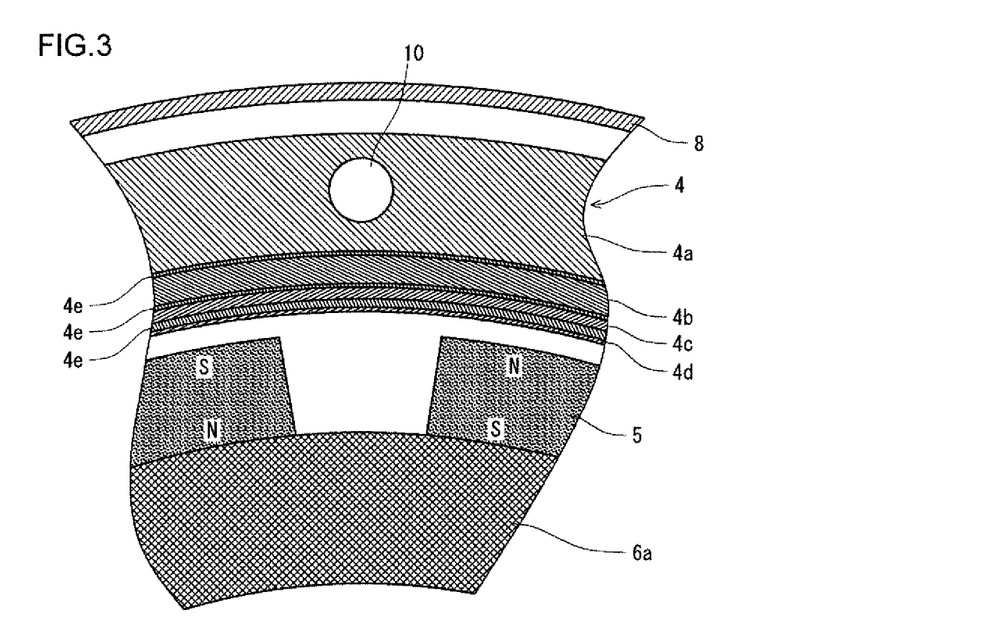
FIG. 3 is a cross-sectional view of a preferred example of a heat generator of the heat generating apparatus according to the first embodiment.

FIG. 3 is a cross-sectional view of a preferred example of a heat generator of the heat generating apparatus according to the first embodiment. FIG. 3 is an enlarged view of the inner peripheral surface of the heat generator 4 facing the magnets 5 and its adjacent area. As seen in FIG. 3, the heat generator 4 includes a first layer 4b, a second layer 4c and an oxidation resistant coating 4d stacked in this order on the inner peripheral surface of a base 4a. The passage 10 is made in the base 4a. The base 4a is made of a conductive metal material with high pyroconductivity (for example, a copper alloy, an aluminum alloy or the like). The first layer 4b is made of a ferromagnetic metal material (for example, carbon steel, cast iron or the like). The second layer 4c is made of a non-magnetic or feebly magnetic metal material, and the material preferably has higher conductivity than the conductivity of the first layer 4b (for example, an aluminum alloy, a copper alloy or the like). The oxidation resistant coating 4d is, for example, a Ni (nickel) plated layer.

Buffer layers 4e are provided between the base 4a and the first layer 4b, between the first layer 4b and the second layer 4c and between the second layer 4c and the oxidation resistant coating 4d. Each of the buffer layers 4e has a linear expansion coefficient that is greater than the linear expansion coefficient of one of its adjacent materials and smaller than the linear expansion coefficient of the other of its adjacent materials. This is for prevention of delamination. The buffer layers 4e are, for example, NiP (nickel-phosphorus) plated layers.

This layered structure increases the eddy currents generated in the heat generator 4 by the effects of magnetic fields from the magnets 5, thereby resulting in achievement of great braking force and sufficient heat generation. However, the second layer 4c may be omitted, and further, the buffer layers 4e may be omitted.

Second Embodiment

Figure 4:
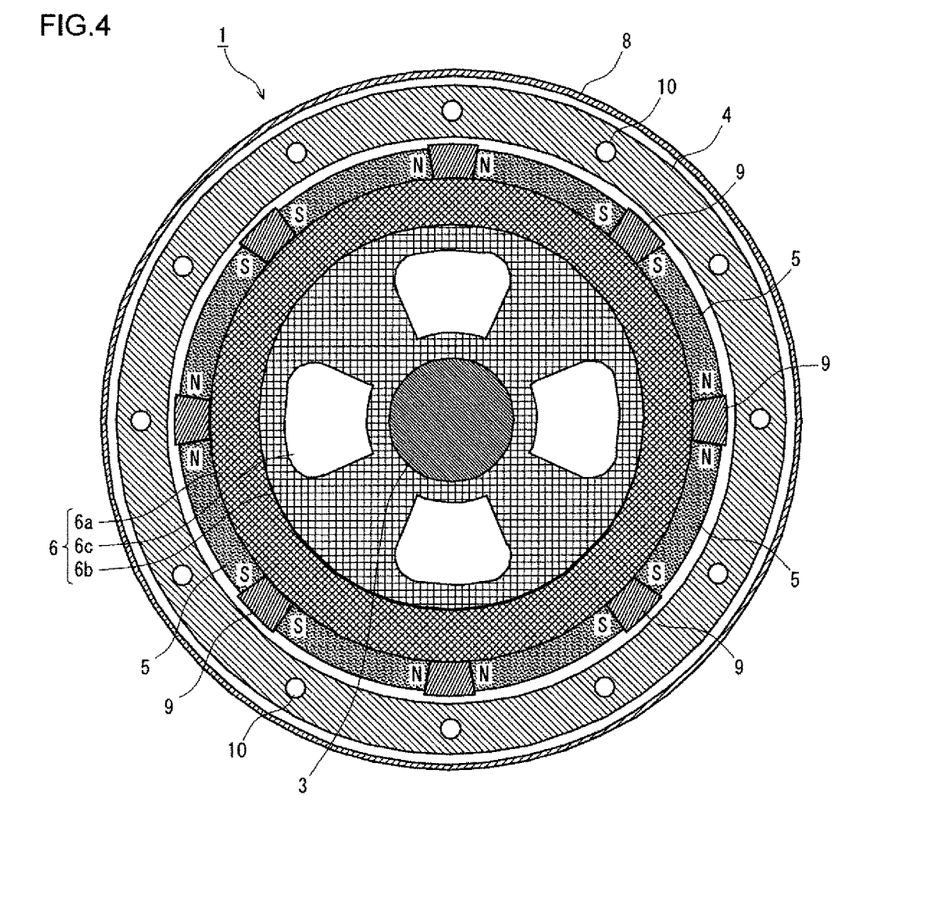
FIG. 4 is a cross-sectional view of a heat generating apparatus according to a second embodiment.

FIG. 4 is a cross-sectional view of a heat generating apparatus 1 according to a second embodiment. The heat generating apparatus 1 according to the second embodiment is based on the structure of the heat generating apparatus 1 according to the first embodiment. The same applies to the third to sixth embodiments which will be described later. The heat generating apparatus 1 according to the second embodiment differs from the heat generating apparatus 1 according to the first embodiment principally in the way of arranging the magnets 5.

As shown in FIG. 4, the magnets 5 are circumferentially arrayed on the outer peripheral surface of the cylindrical member 6a across the whole circumference. The magnetic poles (north pole and south pole) of each of the magnets 5 are circumferentially arranged, and the magnetic pole arrangements of circumferentially adjacent ones of the magnets 5 are opposite to each other. In the second embodiment, the cylindrical member 6a directly holding the magnets 5 is made of a non-magnetic material. Pole pieces made of a ferromagnetic material are provided between the circumferentially arrayed magnets 5.

In the second embodiment, the magnetic fluxes from the magnets 5 (the magnetic fields of the magnets 5) are as follows. Circumferentially adjacent magnets 5 are arranged such that the magnetic poles thereof with the same polarity face each other across a pole piece 9. Also, the cylindrical member 6a holding the magnets 5 is non-magnetic. Therefore, the magnetic fluxes from the south poles of these magnets 5 repel each other and reach the heat generator 4 via the pole piece 9. The magnetic fluxes that have reached the heat generator 4 reach the north poles of the respective magnets 5 via pole pieces 9 respectively adjacent thereto. Thus, each of the magnets 5 forms a magnetic circuit across the magnet 5, the adjacent pole pieces 9 and the heat generator 4. Such magnetic circuits are formed over the entire circumference such that adjacent magnetic fluxes are in opposite directions. Then, the magnetic fields of the magnets 5 spread out, and the magnetic flux density reaching the heat generator 4 becomes high.

Accordingly, the heat generating apparatus 1 according to the second embodiment has the same effects as the heat generating apparatus according to the first embodiment.

Third Embodiment

Figure 5:
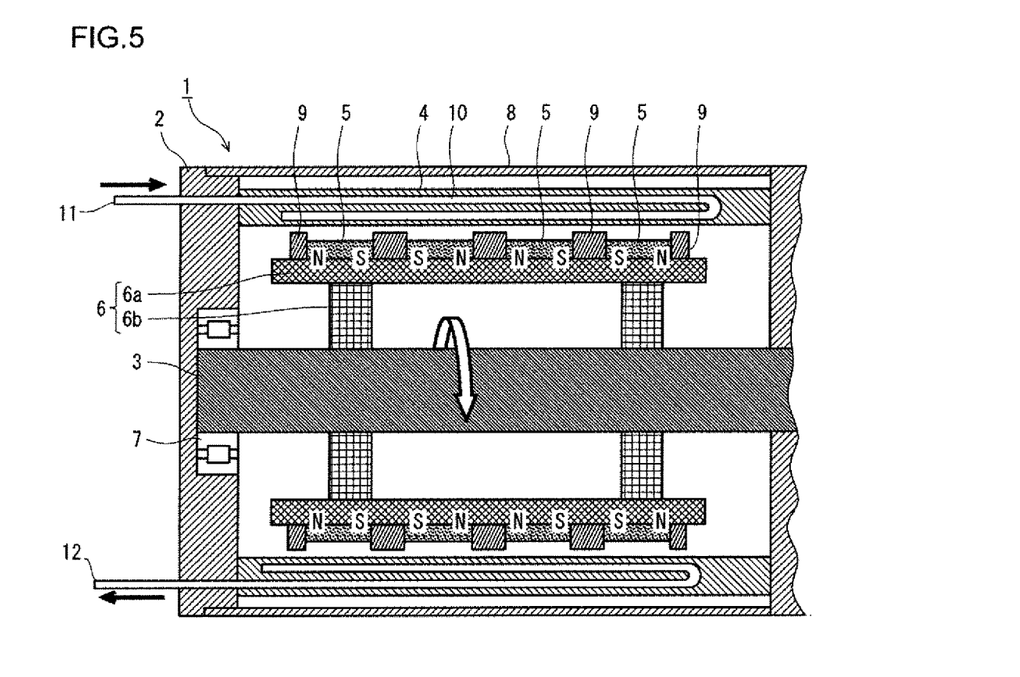
FIG. 5 is a longitudinal sectional view of a heat generating apparatus according to a third embodiment.

FIG. 5 is a longitudinal sectional view of a heat generating apparatus according to a third embodiment. The heat generating apparatus 1 according to the third embodiment differs from the heat generating apparatus 1 according to the first embodiment principally in the way of arranging the magnets 5.

As shown in FIG. 5, the magnets 5 are axially arrayed on the outer peripheral surface of the cylindrical member 6a across the whole axial length. The magnets 5 are cylindrical. The magnetic poles (north pole and south pole) of each of the magnets 5 are axially arranged such that the magnetic pole arrangements of axially adjacent ones of the magnets 5 are opposite to each other. In the third embodiment, the cylindrical member 6a directly holding the magnets 5 is made of a non-magnetic material as with the second embodiment. Pole pieces 9 made of a ferromagnetic material are provided between the axially arrayed magnets 5. Further, pole pieces 9 are provided at both ends of the axial array of magnets 5.

In the third embodiment, the magnetic fluxes from the magnets 5 (the magnetic fields of the magnets 5) are as follows. Axially adjacent magnets 5 are arranged such that the magnetic poles thereof with the same magnetic polarity face each other across a pole piece 9. Also, the cylindrical member 6a holding the magnets 5 is non-magnetic. Therefore, the magnetic fluxes from the south poles of these magnets 5 repel each other and reach the heat generator 4 via the pole piece 9. The magnetic fluxes that have reached the heat generator 4 reach the north poles of the respective magnets 5 via pole pieces 9 respectively adjacent thereto. Thus, each of the magnets 5 forms a magnetic circuit across the magnet 5, the adjacent pole pieces 9 and the heat generator 4. Such magnetic circuits are formed over the entire axial length such that adjacent magnetic fluxes are in opposite directions. Then, the magnetic fields of the magnets 5 spread out, and the magnetic flux density reaching the heat generator 4 becomes high.

Accordingly, the heat generating apparatus 1 according to the third embodiment has the same effects as the heat generating apparatus according to the first embodiment.

Fourth Embodiment

Figure 6:
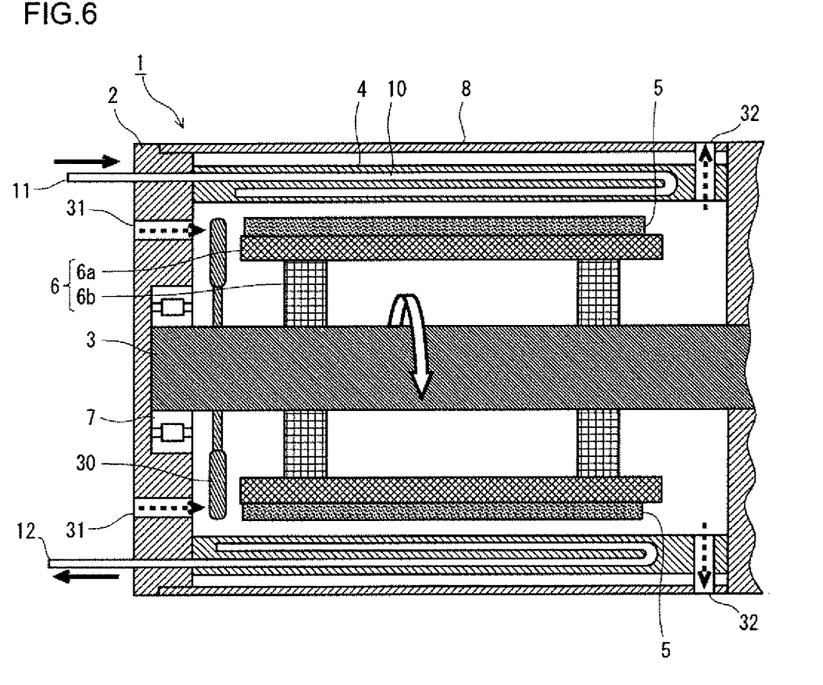
FIG. 6 is a longitudinal sectional view of a heat generating apparatus according to a fourth embodiment.

FIG. 6 is a longitudinal sectional view of a heat generating apparatus according to a fourth embodiment. The heat generating apparatus 1 according to the fourth embodiment is a modification of the heat generating apparatus 1 according to the first embodiment.

As described above, the eddy currents generated in the heat generator 4 cause heat generation in the heat generator 4. Therefore, the magnets 5 may rise in temperature by heat from the heat generator 4 (for example, radiant heat), thereby decreasing the magnetic force of the magnets 5. Therefore, it is preferred to take a measure to inhibit the temperature rise of the magnets 5.

The heat generating apparatus 1 according to the fourth embodiment is configured in light of this point, and includes a cooling system for cooling the magnets 5. As shown in FIG. 6, in the heat generating apparatus 1 according to the fourth embodiment, a propeller 30 is disposed in a position axially adjacent to the cylindrical member 6a. The propeller 30 is fixed to the rotary shaft 3 or the magnet holder 6. Also, an air inlet 31 is made in the body 2 so that external air can be introduced in the space where the magnets 5 and the magnet holder 6 are located (the space being hereinafter referred to as "magnets-lying space"). Further, an air outlet 32 is made in the body 2 so that air can be discharged from the magnets-lying space to the outside. FIG. 6 shows an example where the air outlet 32 pierces through the body 2 and the heat generator 4.

In this structure, when the rotary shaft 3 rotates, the propeller 30 rotates together with the rotary shaft 3. Thereby, external air is introduced in the magnets-lying space through the air inlet 31 (see the solid arrows in FIG. 6). The air introduced in the magnets-lying space is sent toward the magnets 5 by the propeller 30, whereby the air flows around the magnets 5. Meanwhile, the magnets 5 are cooled. The air used for cooling the magnets 5 is discharged to the outside through the air outlet 32 (see the dotted arrow in FIG. 6). In this way, the magnets 5 are forcibly cooled, thereby inhibiting the temperature rise of the magnets 5.

Such a magnet cooling system is applicable to the heat generating apparatuses 1 according to the second and third embodiments.

Fifth Embodiment

Figure 7:
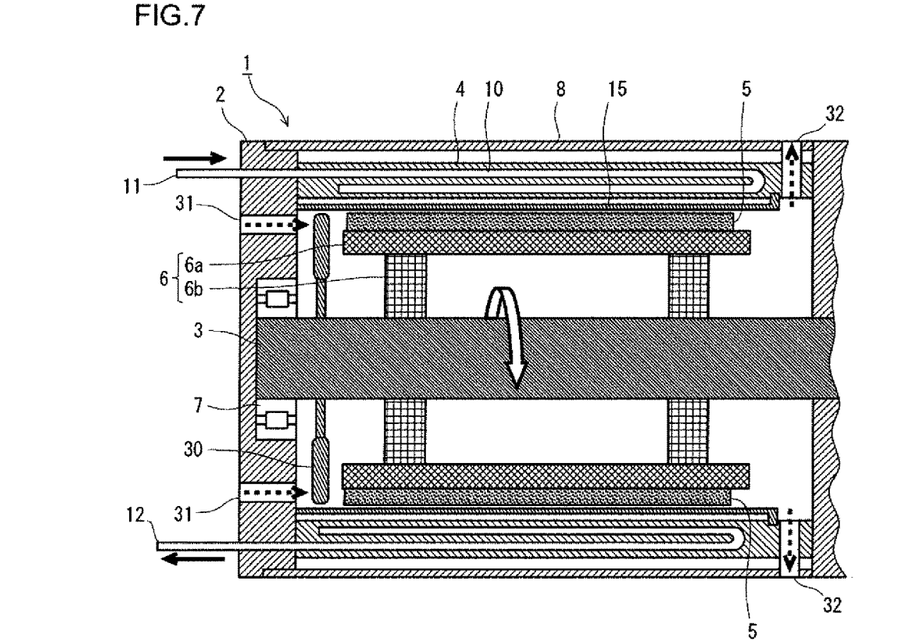
FIG. 7 is a longitudinal sectional view of a heat generating apparatus according to a fifth embodiment.

FIG. 7 is a longitudinal sectional view of a heat generating apparatus according to a fifth embodiment. The heat generating apparatus 1 according to the fifth embodiment is configured in light of inhibition of the temperature rise of the magnets 5, as with the fourth embodiment, and is a modification of the heat generating apparatus 1 according to the fourth embodiment shown in FIG. 6.

As shown in FIG. 7, the heat generating apparatus 1 according to the fifth embodiment includes a cylindrical partition wall disposed between the heat generator 4 and the magnets 5 as well as the magnet cooling system used in the fourth embodiment. The partition wall 15 is fixed to the body 2. The partition wall 15 is made of a non-magnetic material, and the material is also low-conductive or non-conductive. This is to prevent the partition wall 15 form exerting adverse effects on the magnetic fields from the magnets 5 to the heat generator 4. Moreover, this is to prevent heat generation of the partition wall 15 even when the partition wall 15 moves relative to the magnets 5. FIG. 7 shows an example where one end of the partition wall 15 is fixed to the body 2, and the other end is fixed to the heat generator 4. The air outlet 32 pierces through the body 2 and the heat generator 4, in a portion out of the partition wall 15.

In this structure, the magnets 5 are forcibly cooled as with the fourth embodiment, and additionally, the partition wall 15 blocks the heat from the generator 4 (for example, radiant heat). Thereby, the temperature rise of the magnets 5 can be inhibited. In the fifth embodiment, it is preferred that the space between the heat generator 4 and the partition wall 15 is filled with a heat insulating material or made vacuum. This ensures the blocking of the heat from the heat generator 4.

The magnet cooling system used in the fourth embodiment may be omitted from the fifth embodiment. The partition wall 15 used in the fifth embodiment is applicable to any other heat generating apparatus according to the present invention. For example, the partition wall 15 is applicable to the heat generating apparatuses according to the first, second and third embodiments. Also, the partition wall 15 is applicable to a heat generating apparatus including a disk-shaped heat generator, which will be described later. In this case, typically, a disk-shaped partition wall is disposed between the disk-shaped heat generator and a disk-shaped magnet holder.

Sixth Embodiment

Figure 8:
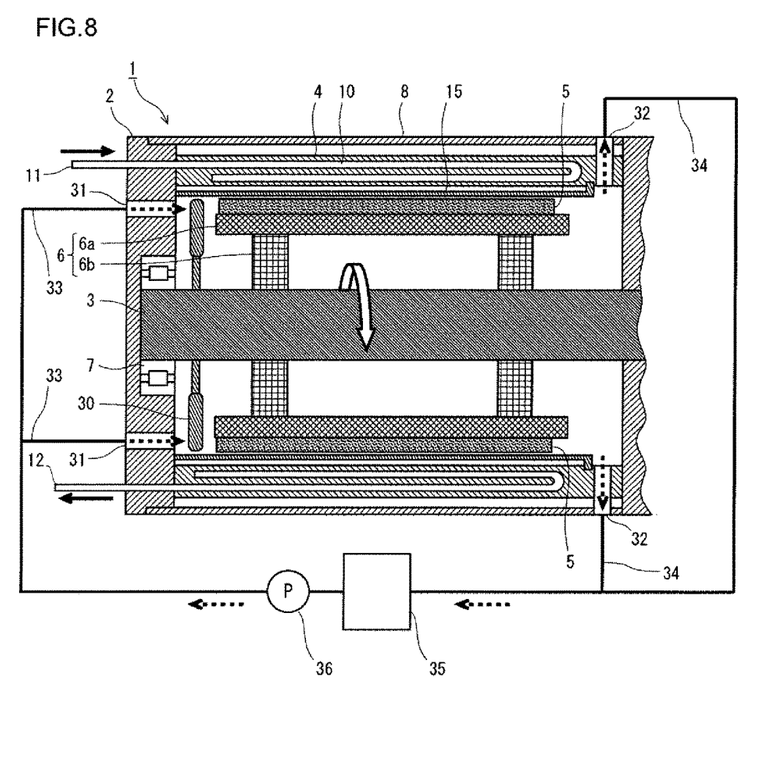
FIG. 8 is a longitudinal sectional view of a heat generating apparatus according to a sixth embodiment.

FIG. 8 is a longitudinal sectional view of a heat generating apparatus according to a sixth embodiment. The heat generating apparatus 1 according to the sixth embodiment is configured in light of the inhibition of the temperature rise of the magnets 5 as with the fourth embodiment, and is a modification of the heat generating apparatus 1 according to the fifth embodiment shown in FIG. 7.

As shown in FIG. 8, the heat generating apparatus 1 according to the sixth embodiment includes a magnet cooling system having the following structure. An inlet pipe 33 and an outlet pipe 34 are connected to the air inlet 31 and the air outlet 32, respectively, of the magnets-lying space. The inlet pipe 33 and the outlet pipe 34 are connected to a heat exchanger 35. The magnets-lying space, the inlet pipe 33, the outlet pipe 34 and the heat exchanger 35 form a passage, and a cooling medium flows and circulates in this passage (see the dotted arrows in FIG. 8). In the passage, a pump 36 is provided to send the cooling medium.

In this structure, the cooling medium is introduced in the magnets-lying space through the inlet 31 by the operation of the pump 36 (see the dotted arrows in FIG. 8). The cooling medium introduced in the magnets-lying space flows around the magnets 5. Meanwhile, the magnets 5 are cooled. The cooling medium that has cooled the magnets 5 is discharged into the outlet pipe 34 through the outlet 32 (see the dotted arrows in FIG. 8). The cooling medium discharged into the outlet pipe 34 is cooled in the heat exchanger 35 and then, sent to the inlet pipe 33. In this way, the magnets 5 are forcibly cooled, thereby inhibiting the temperature rise of the magnets 5.

In the sixth embodiment, the cooling medium is moved by the operation of the pump 36, and therefore, the propeller 30 may be omitted. However, the propeller 30 is useful to send the cooling medium toward the magnets 5. In the sixth embodiment, the partition wall 15 may be omitted. However, the partition wall 15 is useful to prevent unnecessary cooling of the heat generator 4. This magnet cooling system used in the sixth embodiment is applicable to any other heat generating apparatus according to the present invention. For example, the magnet cooling system used in the sixth embodiment is applicable to the heat generating apparatuses according to the first, second and third embodiments. Also, the magnet cooling system is applicable to the heat generating apparatus including a disk-shaped heat generator, which will be described later.

The present invention is not limited to the above-described embodiments, and it is possible to carry out the present invention by appropriately modifying the above-described embodiments without departing from the spirit and scope thereof. For example, in the above-described embodiments, the heat generator 4 is cylindrical, but the heat generator 4 may be shaped like a disk that is coaxial with the rotary shaft 3. In this case, the magnet holder 6 is shaped like a disk that is coaxial with the rotary shaft 3. The disk-shaped magnet holder includes a disk-shaped member facing a principal surface (one of the surfaces on both sides in the axial direction) of the disk-shaped heat generator, and the magnet holder 6 holds the magnets 5 on its surface facing the principal surface of the heat generator. Accordingly, the magnets face the principal surface of the heat generator with a gap. In this case, there are possible three ways of arranging the magnets 5 as follows.

A first way of arrangement is based on the magnet arrangement in the first embodiment. In the first way of arrangement, the magnets are circumferentially arrayed across the whole circumference. The magnetic poles (north pole and south pole) of each of the magnets are axially arranged, and the magnetic pole arrangements of circumferentially adjacent ones of the magnets are opposite to each other. In this case, the disk-shaped member directly holding the magnets is made of a ferromagnetic material.

A second way of arrangement is based on the magnet arrangement in the second embodiment. In the second way of arrangement, the magnets are circumferentially arrayed across the whole circumference. The magnetic poles (north pole and south pole) of each of the magnets are circumferentially arranged, and the magnetic pole arrangements of circumferentially adjacent ones of the magnets are opposite to each other. In this case, the disk-shaped member directly holding the magnets is made of a non-magnetic material. Pole pieces made of a ferromagnetic material are provided between the circumferentially arrayed magnets.

A third way of arrangement is based on the magnet arrangement in the third embodiment. In the third way of arrangement, the magnets are ring-shaped, and the ring-shaped magnets are coaxially arrayed in the radial direction. The magnetic poles (north pole and south pole) of each of the magnets are radially arranged, and the magnetic pole arrangements of radially adjacent ones of the magnets are opposite to each other. In this case, the disk-shaped member directly holding the magnets is made of a non-magnetic material. Pole pieces made of a ferromagnetic material are provided between the radially arrayed magnets. Additionally, pole magnets are provided at both ends of the radial array of magnets.

The heat generating apparatuses described above can be mounted not only in wind electric generating facilities but also in hydroelectric generating facilities and other power-generating facilities utilizing kinetic energy of a fluid.

Further, the heat generating apparatuses described above can be mounted in vehicles (for example, trucks, buses and the like). In such a case, any of the heat generating apparatuses may be provided in a vehicle as a component separate from an eddy current decelerator serving as an auxiliary brake or alternatively may be provided in a vehicle to double as an auxiliary brake. In a case where any of the heat generating apparatuses doubles as an auxiliary brake, a switch mechanism shall be provided for switching between braking and non-braking. When any of the heat generating apparatuses is used as an auxiliary brake (decelerator), the apparatus reduces the rotational speeds of the rotary shafts such as the propeller shaft, the drive shaft and the like. Thereby, the running speed of the vehicle is controlled. In this regard, along with the generation of braking force to reduce the rotational speeds of the rotary shafts, heat is generated. The heat recovered by the heat generating apparatus mounted in the vehicle is utilized, for example, as a heat source for a heater for heating the inside of the vehicle or as a heat source for a refrigerator for refrigerating the inside of a container.

INDUSTRIAL APPLICABILITY

The eddy current heat generating apparatuses according to the present invention can be effectively employed in power-generating facilities utilizing kinetic energy of a fluid, such as wind electric generating facilities, hydroelectric generating facilities and the like, and in vehicles, such as trucks, busses and the like.

REFERENCE SYMBOLS

1: eddy current heat generating apparatus
2: body
3: rotary shaft
4: heat generator
4a: base
4b: first layer
4c: second layer
4d: oxidation resistant coating
4e: buffer layer
5: permanent magnet
6: magnet holder
6a: cylindrical member
6b: connection member
6c: through hole
7: bearing
8: cover
9: pole piece 10: passage
11: inlet
12: outlet
15: partition wall
20: propeller
21: rotary shaft
22: brake system
23: clutch
24: accelerator
25: bearing
30: propeller
31: air inlet
32: air outlet
33: inlet pipe
34: outlet pipe
35: heat exchanger
36: pump

The invention claimed is:

1. An eddy current heat generating apparatus, comprising:
a rotary shaft rotatably supported by a non-rotative member;
a heat generator fixed to the non-rotative member, the heat generator being cylindrical;
a plurality of permanent magnets arrayed to face the heat generator with a gap such that magnetic pole arrangements of adjacent ones of the permanent magnets are opposite to each other;
a magnet holder holding the permanent magnets and fixed to the rotary shaft; and
a heat recovery system collecting heat generated in the heat generator, wherein
a non-magnetic cylindrical partition wall is provided in the gap between the heat generator and the permanent magnets, the non-magnetic cylindrical partition wall being spaced from or independent of the permanent magnets.

2. The eddy current heat generating apparatus according to claim 1, wherein
a space between the heat generator and the partition wall is filled with a heat insulating material or alternatively is made vacuum.

3. The eddy current heat generating apparatus according to claim 1, wherein
the heat recovery system includes:
a passage formed inside the heat generator;
pipes connected to an inlet and an outlet, respectively, of the passage;
a heat storage device connected to the pipes; and
a heat medium circulating in the passage, the pipes and the heat storage device.

4. The eddy current heat generating apparatus according to claim 1, wherein
thermal energy is recovered from kinetic energy of the rotary shaft rotated by kinetic energy of a fluid.

5. The eddy current heat generating apparatus according to claim 1, further comprising
a cooling system configured to cool the permanent magnets.

6. The eddy current heat generating apparatus according to claim 1, wherein:
the permanent magnets are circumferentially arrayed to face a whole circumference of an inner peripheral surface of the heat generator such that magnetic poles of each of the permanent magnets are radially arranged and such that the magnetic pole arrangements of adjacent ones of the circumferentially arrayed permanent magnets are opposite to each other.

7. The eddy current heat generating apparatus according to claim 6, wherein:
the magnet holder includes a cylindrical member holding the permanent magnets on its outer peripheral surface; and
the cylindrical member is ferromagnetic.

8. The eddy current heat generating apparatus according to claim 1, wherein:
the permanent magnets are circumferentially arrayed to face a whole circumference of an inner peripheral surface of the heat generator such that magnetic poles of each of the permanent magnets are circumferentially arranged and such that the magnetic pole arrangements of adjacent ones of the circumferentially arrayed permanent magnets are opposite to each other.

9. The eddy current heat generating apparatus according to claim 8, wherein:
the magnet holder includes a cylindrical member holding the permanent magnets on its outer peripheral surface; and
the cylindrical member is non-magnetic, and pole pieces are provided between the circumferentially arrayed permanent magnets.

10. The eddy current heat generating apparatus according to claim 1, wherein:
the permanent magnets are axially arrayed to face a whole axial length of an inner peripheral surface of the heat generator such that magnetic poles of each of the permanent magnets are axially arranged and such that the magnetic pole arrangements of adjacent ones of the axially arrayed permanent magnets are opposite to each other.

11. The eddy current heat generating apparatus according to claim 10, wherein:
the magnet holder includes a cylindrical member holding the permanent magnets on its outer peripheral surface; and
the cylindrical member is non-magnetic, and pole pieces are provided between the axially arrayed permanent magnets and at both ends of the axial array of permanent magnets.

12. The eddy current heat generating apparatus according to claim 1, wherein:
the heat generator is made of one or more kinds of conductive magnetic materials.

13. The eddy current heat generating apparatus according to claim 1, wherein:
the heat generator is made of at least a conductive ferromagnetic material and a conductive non-magnetic material, the conductive non-magnetic material lying close to the permanent magnets.

* * * * *